United States Patent [19]

Thakkar et al.

[11] Patent Number: 5,861,211
[45] Date of Patent: Jan. 19, 1999

[54] ARTICLES INCORPORATING PRESSURE-SENSITIVE ADHESIVES HAVING IMPROVED ADHESION TO PLASTICIZED POLYVINYL CHLORIDE

[75] Inventors: Bimal V. Thakkar, Minneapolis; Albert I. Everaerts, Oakdale, both of Minn.

[73] Assignee: Minnesota Mining & Manufacturing Company, St. Paul, Minn.

[21] Appl. No.: 695,498

[22] Filed: Aug. 12, 1996

Related U.S. Application Data

[63] Continuation-in-part of Ser. No. 389,719, Feb. 16, 1995, abandoned.

[51] Int. Cl.$^6$ ............................. B32B 27/06; B32B 31/04
[52] U.S. Cl. ..................... 428/343; 428/344; 428/355 R; 428/355 EN; 428/355 CN; 428/355 AC; 428/461; 428/463; 428/518; 428/522; 428/141; 156/273.3; 156/275.5; 156/275.7; 156/327; 156/330.9
[58] Field of Search .................................. 428/343, 344, 428/345, 353, 355 R, 355 EN, 355 CN, 355 AC, 411.1, 461, 463, 500, 518, 522, 67, 141, 143, 156, 174; 526/258, 264, 265, 319, 307.6, 307.7, 318.4; 156/273.3, 275.5, 275.7, 327, 330.9

[56] References Cited

U.S. PATENT DOCUMENTS

| | | | |
|---|---|---|---|
| H688 | 10/1989 | Sobataka et al. | 204/165 |
| Re. 24,906 | 12/1960 | Ulrich | 206/59 |
| 2,407,680 | 9/1946 | Palmquist et al. | 88/82 |
| 3,140,340 | 7/1964 | Weber | 88/82 |
| 3,190,178 | 6/1965 | McKenzie | 88/82 |
| 3,578,622 | 5/1971 | Brown et al. | 260/33.8 |
| 3,648,348 | 3/1972 | Freimuth | 29/200 B |
| 3,684,348 | 8/1972 | Rowland | 350/103 |
| 4,025,159 | 5/1977 | McGrath | 350/105 |
| 4,329,384 | 5/1982 | Vesley et al. | 428/40 |
| 4,330,590 | 5/1982 | Vesley | 428/336 |
| 4,364,972 | 12/1982 | Moon | 427/54.1 |
| 4,379,201 | 4/1983 | Heilmann et al. | 428/345 |
| 4,511,210 | 4/1985 | Tung et al. | 350/105 |
| 4,576,850 | 3/1986 | Martens | 428/156 |
| 4,588,258 | 5/1986 | Hoopman | 350/103 |
| 4,605,592 | 8/1986 | Paquette et al. | 428/334 |
| 4,619,979 | 10/1986 | Kotnour et al. | 526/88 |
| 4,664,966 | 5/1987 | Bailey et al. | 428/203 |
| 4,732,790 | 3/1988 | Blackburn et al. | 427/407.1 |
| 4,737,559 | 4/1988 | Kellen et al. | 526/291 |
| 4,775,219 | 10/1988 | Appeldorn et al. | 350/103 |
| 4,801,193 | 1/1989 | Martin | 350/103 |
| 4,805,984 | 2/1989 | Cobb, Jr. | 350/96.8 |
| 4,843,134 | 6/1989 | Kotnour et al. | 526/318.4 |
| 4,895,428 | 1/1990 | Nelson et al. | 350/103 |
| 4,896,943 | 1/1990 | Tolliver et al. | 350/105 |
| 4,906,070 | 3/1990 | Cobb, Jr. | 359/286 |
| 4,938,563 | 7/1990 | Nelson et al. | 350/103 |
| 4,943,461 | 7/1990 | Karim | 428/40 |
| 4,946,742 | 8/1990 | Landin. | 428/354 |
| 4,985,488 | 1/1991 | Landin | 524/555 |
| 5,019,377 | 5/1991 | Torgerson | 424/70 |

(List continued on next page.)

FOREIGN PATENT DOCUMENTS

| | | |
|---|---|---|
| 372756B1 | 6/1990 | European Pat. Off. . |
| 0 405 798 | 1/1991 | European Pat. Off. . |
| 450963 | 10/1991 | European Pat. Off. . |
| 0 566 093 | 10/1993 | European Pat. Off. . |
| 0 600 428 A1 | 6/1994 | European Pat. Off. . |
| 0 615983A2 | 9/1994 | European Pat. Off. . |
| 4313008C1 | 11/1994 | Germany . |
| 2-200476 | 8/1990 | Japan . |
| 5-105857 | 4/1993 | Japan . |
| 5-140523 | 6/1993 | Japan . |
| 5-263055 | 10/1993 | Japan . |
| 5-263064 | 10/1993 | Japan . |
| 5-310810 | 11/1993 | Japan . |
| 6-128544 | 5/1994 | Japan . |
| 6-166857 | 6/1994 | Japan . |
| 6-166858 | 6/1994 | Japan . |
| 6-172720 | 6/1994 | Japan . |
| 6-172729 | 6/1994 | Japan . |
| 6-200225 | 7/1994 | Japan . |
| 8-143843 | 6/1996 | Japan . |
| WO 92/05225 | 4/1992 | WIPO . |
| WO 93/10985 | 6/1993 | WIPO . |
| WO 93/16131 | 8/1993 | WIPO . |
| WO 94/19711 | 9/1994 | WIPO . |
| WO 95/13331 | 5/1995 | WIPO . |

OTHER PUBLICATIONS

Truck Cover Market Report, Data Textile, May 1991. pp. 10–11.

Analysis of air–corona–treated polypropylene and poly (ethylene terephthalate) films by contact–angle measurements and X–ray phootelectron spectorscopy, J. Adhesion Sci. Technol., vol. 6, No. 4, pp. 429–443 (1992).

The Theory and Pactice of Corona Treatment for Improving Adhesion, TAPPI, vol. 65, No. 8, pp. 75–78 (Aug. 1982).

*Primary Examiner*—Marie Yamnitzky
*Attorney, Agent, or Firm*—Lisa M. Fagan

[57] ABSTRACT

Articles comprising a substrate, preferably a retroreflective sheeting, having a coating of a pressure-sensitive adhesive composition, and articles wherein the adhesive adheres the substrate to a highly monomericly plasticized PVC component, preferably a PVC coated fabric. The adhesive comprises a crosslinked copolymer of a first monofunctional acrylate ester of a non-tertiary alcohol having as a homopolymer a glass transition temperature of less than $-25°$ C., a nitrogen containing moderately basic monomer copolymerizable therewith selected from the group consisting of N,N-dialkyl substituted amides, an optional copolymerizable acidic monomer, an optional second monofunctional acrylate ester of a non-tertiary alcohol having as a homopolymer a glass transition temperature $-25°$ C. or greater, and a crosslinking agent. A method of bonding a highly monomericly plasticized PVC component to a substrate, preferably a retroreflective sheeting, using the adhesive.

22 Claims, 1 Drawing Sheet

U.S. PATENT DOCUMENTS

| | | | |
|---|---|---|---|
| 5,056,892 | 10/1991 | Cobb, Jr. | 359/831 |
| 5,063,106 | 11/1991 | Nieuwenhuize et al. | 428/343 |
| 5,064,272 | 11/1991 | Bailey et al. | 359/541 |
| 5,066,098 | 11/1991 | Kult et al. | 359/540 |
| 5,079,047 | 1/1992 | Bogaert et al. | 428/41 |
| 5,085,918 | 2/1992 | Rajan et al. | 428/195 |
| 5,137,972 | 8/1992 | Cook | 525/123 |
| 5,138,488 | 8/1992 | Szczech | 359/529 |
| 5,175,030 | 12/1992 | Lu et al. | 428/30 |
| 5,183,597 | 2/1993 | Lu | 264/1.4 |
| 5,202,361 | 4/1993 | Zimmerman et al. | 522/120 |
| 5,229,207 | 7/1993 | Paquette et al. | 428/355 |
| 5,257,491 | 11/1993 | Rouyer et al. | 53/428 |
| 5,262,479 | 11/1993 | Tobing | 525/71 |
| 5,334,447 | 8/1994 | Kitamura et al. | 428/317.3 |
| 5,334,686 | 8/1994 | Ando et al. | 526/307.7 |
| 5,407,971 | 4/1995 | Everaerts | 522/35 |

# ARTICLES INCORPORATING PRESSURE-SENSITIVE ADHESIVES HAVING IMPROVED ADHESION TO PLASTICIZED POLYVINYL CHLORIDE

CROSS-REFERENCE TO RELATED APPLICATIONS

This application is a continuation-in-part of assignee's pending application Ser. No. 08/389,719, filed Feb. 16, 1995 (now abandoned), which is incorporated by reference herein.

BACKGROUND OF THE INVENTION

1. Field of the Invention

The present invention relates generally to signage articles such as retroreflective and non-retroreflective articles. More particularly, the invention relates to pressure-sensitive adhesives which allow excellent adhesion of retroreflective and non-retroreflective base substrates to surfaces such as highly monomericly plasticized polyvinyl chloride coated fabric, as may frequently be used in tarpaulins.

2. Related Art

In the article "Truck Cover Market Report", *Data Textile*, May 1991, distinction is made between tarpaulins and truck covers. A truck cover is defined as a fitted cover or a cover specifically designed for use on a flat bed, open top, dump truck or trailer, and differs strictly from a tarpaulin per se, since tarpaulins are not usually fitted for any particular use. For the purpose of the present invention, the terms are interchangeable.

As discussed in Patent Cooperation Treaty (PCT) application no. WO 93/10985, published Jun. 10, 1993, tarpaulins usually consist of a fabric coated with a plastic material. The fabric, although not required in all instances, is usually a woven polyester or nylon, which may have a weft insertion. The plastic material is typically chosen to be tough and flexible, and thus plasticized polyvinyl chloride (PVC), polyamides (such as nylon and aramid), and polyprenes (such as chloroprene rubber) are commonly employed. Tarpaulins are used for many cover purposes, e.g., within the building industry, and in particular for covering trucks. They are also used for making larger tents, e.g., for use in temporary military quarters and refugee camps as well as for public events.

As further stated in the above-mentioned PCT application, it is common practice to print logos, company names, slogans, instructions and other decorations on truck tarpaulins, for informative and for advertising purposes. Reflecting decorations are particularly advantageous, making the trucks visible at night. Often these decorations or adherends are applied outdoors to the truck canvases. Thus, suitable PSAs preferably are capable of application over a broad range of temperatures.

One solution to the problem is described in the above-mentioned PCT application, which describes a tarpaulin comprising a fabric coated with a plastic material, preferably PVC, polyamide, or polyprene, provided with a decoration of a reflecting material by anchoring (with an overlaying transparent flexible film) a reflecting sheet to a piece of intermediate tarpaulin cloth, whose coating is of the same type as (or is compatible with) that of the tarpaulin, by high frequency welding or heat application, and then applying the piece of intermediate tarpaulin cloth provided with reflecting sheet and overlaying transparent flexible film, optionally formed in the desired shape, to the tarpaulin by hot air fusion.

PVC coated fabrics differ primarily in the type and amount of plasticizer added to the PVC. One commercially available PVC coated fabric has been analyzed to contain up to 42 weight percent of low molecular weight monomeric plasticizer. These low molecular weight monomeric plasticizers tend to migrate to the surface of the PVC coated fabric, and tend to cause problems in adhering materials to the PVC coated fabric with pressure-sensitive adhesives (PSAs).

Acrylic PSAs generally comprise a primary component of acrylate or methacrylate monomer or a combination of such monomers which, when polymerized, have a low glass transition temperature ($T_g$) and low modulus (i.e. they are rubbery and soft). These soft, tacky low $T_g$ monomers are typically copolymerized with a secondary component consisting of high $T_g$ monomers, usually polar monomers such as acrylic acid, methacrylic acid, itaconic acid, acrylamide, methacrylamide, and mixtures thereof. As described in U.S. Pat. No. Re 24,906 (Ulrich), when such polar monomers are incorporated with a predominance of low $T_g$ monomers, a sufficiently tacky pressure-sensitive adhesive is formed having high cohesive or internal strength. Further increase in internal or cohesive strength (i.e., shear strength), which is often required to resist the severe environmental and chemical conditions found in transportation applications, can be obtained via crosslinking.

One approach to reducing the tendency of monomeric plasticizers from migrating out of highly monomericly plasticized PVC coated fabric and into the attached PSA is to load the adhesive with plasticizer, thereby reducing the mass transfer gradient for plasticizer migration from the PVC into the adhesive. Such an approach was taken in U.S. Pat. No. 4,946,742 (Landin), which discloses normally tacky and pressure-sensitive adhesives having excellent long-term adhesion to plasticized vinyl surfaces, prepared from a representative blend of dioctyl phthalate plasticizer and a terpolymer of an alkyl acrylate, a nitrogen containing vinyl monomer and a vinyl carboxylic acid. Addition of the plasticizer to the adhesive, however, adds to the cost of the adhesive, and requires an additional process step. Furthermore, if the plasticizer present in the PVC coated fabric is different from the plasticizer present in the adhesive, a driving force still exists for the plasticizer present in the PVC coated fabric to migrate into the adhesive due to the concentration gradient.

Development of a non-plasticized PSA would allow all fabricators to apply cube-corner type and other types of retroreflective sheeting onto monomericly plasticized PVC coated fabrics, thereby reducing or eliminating the need for thermal attachment methods and for plasticized PSAs.

Assignee's published European patent application no. 615 983 A2, published Sep. 1, 1994, describes a PSA having outstanding ability to bond to solid acidic surfaces such as acidic acid-rain resistant automotive paints and PVC, and to remain firmly bonded thereto, comprising (a) about 60 to about 90 parts by weight of at least one monomer selected from the group consisting of monofunctional unsaturated (meth)acrylate esters of non-tertiary alkyl alcohols, and mixtures thereof, the alkyl groups of which comprise from about 4 to about 12 carbon atoms which as homopolymers have glass transition temperatures below about −20° C.; (b) correspondingly, about 40 to about 10 parts by weight of a basic monomer copolymerizable with the monomer of component (a); (c) about 0 to about 3 parts by weight of an acidic monomer copolymerizable with the monomers of components (a) and (b) wherein when the acidic monomer is included, the basic copolymerizable monomer should be present in a molar excess; and (d) about 0.05 to about 1 percent by weight of a crosslinking agent based upon the total weight of (a) plus (b) plus (c). Representative examples of copolymers described therein are copolymers of isooctyl acrylate (low Tg monomer), acrylic acid and a basic copolymerizable monomer which may be selected from strongly basic, moderately basic, and wealdy basic monomers. Although this work is impressive, there was not disclosed or suggested the use of the PSA compositions therein disclosed in binding a variety of materials, such as used in reflective and non-reflective signage articles, to highly monomericly plasticized PVC surfaces.

PCT application WO 94/19711, published Sep. 1, 1994, describes a retroreflective structure in which an array of free-standing retroreflective prisms is formed on a substrate for application of the structure to pre-existing substrates formed of compatible fabrics, such as tarpaulins. The structure employs a non-pressure-sensitive adhesive which requires time to cure, such as a one component moisture-curable polyurethane adhesive, to adhere the free-standing prisms to the substrate, and thus the structure requires preassembly.

It would be advantageous if pressure-sensitive adhesives lacking plasticizer could be used to adhere retroreflective and non-retroreflective sheeting to highly monomericly plasticized PVC surfaces.

SUMMARY OF THE INVENTION

In accordance with the present invention, articles are presented which utilize a select class of acrylate adhesives, some of which were disclosed in assignee's previously mentioned published European application, to adhere a variety of materials (such as sealing films of cube-corner retroreflective sheeting, wherein the sealing film is made using a variety of polymeric materials, for example polyurethane, polyester, and polyvinylchloride films, and/or directly to cube-corners made of acrylic or polycarbonate polymers, or metallized cube-corners, or other types of retroreflective sheetings (such as beaded sheetings) and non-reflective base sheetings) to a highly monomericly plasticized polyvinylchloride (PVC) component, with sufficient peel strength, static shear strength and tolerance to plasticizer and moisture to pass at least three, preferably all tests demanded of such signage articles. Additionally, preferred PSAs are capable of being applied at a range of temperatures, for example at 10° C. to 40° C. As used herein the term PVC component includes PVC coated fabrics and PVC articles devoid of fabric. Particularly preferred highly monomericly plasticized PVC components are PVC coated fabrics.

In particular, one aspect of the invention is an article comprising:

(a) a layer of pressure-sensitive adhesive comprising a crosslinked copolymer of 100 parts by weight monomer of components (i), (ii), (iii) and (iv) wherein the copolymer comprises:
  (i) about 50 to about 90 parts by weight (more preferably about 60 to about 80 parts by weight) of at least one monomer selected from the group consisting of a first monofunctional acrylate ester of a non-tertiary alkyl alcohol, and mixtures thereof, the alkyl group of which comprises from about 4 to about 12 carbon atoms, which as a homopolymer has a glass transition temperature less than −25° C.;
  (ii) about 10 to about 25 parts by weight (preferably about 10 to about 15 parts by weight) of a moderately basic, copolymerizable (i.e. containing one ethylenically unsaturated group) N,N-dialkyl substituted amides (preferably within the general formula (I):

$$CH_2=\underset{\underset{R}{|}}{C}-Z \qquad (I)$$

wherein:
  R is selected from the group consisting of —H and —CH$_3$;
  Z is —C(=O)NR$^1$R$^2$;
  R$^1$ and R$^2$ are independently selected from the group consisting of
  alkyl groups having from 1 to 10 carbon atoms);
  (iii) 0 to about 7 parts by weight (more preferably from about 3 to about 6 parts by weight, most preferably from about 5 to about 6 parts by weight) of an acidic monomer copolymerizable with the monomers of components (i) and (ii) wherein when the acidic monomer is included, the basic copolymerizable monomer is present in a molar excess;
  (iv) 0 to about 30 parts by weight of a second monofunctional acrylate ester of a non-tertiary alcohol having as a homopolymer a glass transition temperature equal to or greater than −25° C.; and
  (v) about 0.01 to about 1 percent by weight of a crosslinking agent based upon the total weight of (i) plus (ii) plus (iii) plus (iv), wherein the relative amounts of the monomers are selected such that the article passes at least three (preferably four, most preferably all) tests selected from the group consisting of a pressure wash test after water soaking, a pressure wash test after thermal conditioning, a static shear test (initial) and after thermal conditioning, a T-peel test (initial), a T-peel test after thermal conditioning, and a T-peel test after water soaking (these tests being more fully described herein); wherein said tests are performed with the article applied to an acidic surface; and (b) an adherend onto which the layer of adhesive is coated.

Preferably the adhesive is used to adhere a highly monomericly plasticized PVC component, preferably a PVC coated fabric, to the adherend.

As an alternate embodiment, component (v) may comprise about 0.01 to about 1 percent by weight of a crosslinking agent based upon the total weight of (i) plus (ii) plus (iii) plus (iv), wherein the relative amounts of the monomers are selected such that the article having a pressure-sensitive adhesive consisting essentially of components (i) through (iv) passes at least three (preferably four, most preferably all) tests selected from the group consisting of a pressure wash test after water soaking, a pressure wash test after thermal conditioning, a static shear test (initial) and after thermal conditioning, a T-peel test (initial), a T-peel test after thermal conditioning, and a T-peel test after water soaking; wherein said tests are performed with the article applied to an acidic surface.

The adherend layer is preferably selected from the group consisting of i) a sealing film (preferably polyurethane, polyester, polyvinylchloride or polycarbonate) attached to a transparent retroreflective sheeting having a substantially flat surface and a structured second surface, the structured second surface comprised of a plurality of grooves defining a plurality of peaks, ii) a metallized retroreflective sheeting having a substantially flat surface and structured second surface, the structured surface having a layer of metal thereon, iii) the non-light-impinging surface of a beaded retroreflective sheeting (i.e., retroreflective sheetings comprising a plurality of transparent microbeads), and iv) other non-retroreflective adherends, such as polymeric films including polyurethane films, polyolefin films, and plasticized vinyl films (such as described in U.S. Pat. No. 4,605, 592, Paquette et al., incorporated herein by reference), or metallic films such as aluminum.

In one retroreflective article embodiment of the invention, the article may be attached to a PVC coated fabric using thermal methods, such as high frequency welding, hot air fusion, and the like. This is useful when it is desired to add retroreflective sheeting to used or old tarpaulins, or when repairing torn or worn tarpaulins.

Another aspect of the invention is a method of bonding a highly monomericly plasticized PVC component to an adherend, the method comprising the steps of:

(a) formulating an adhesive composition as described in reference to the inventive signage article;

(b) applying the adhesive composition either to a highly monomericly plasticized PVC component, an attachment surface (i.e. a surface opposite the non-reflective surface) of an adherend, or both; and (c) joining the surface of the adherend with the PVC component, the adhesive composition positioned between the PVC component and the attachment surface of the adherend, wherein the attachment surface of the adherend is defined by previously mentioned adherends.

One great advantage of the method of the invention, particularly when retroreflective substrates are to be adhered to truck tarpaulins as conspicuity markings, is that the user can easily apply the retroreflective sheeting to the tarpaulin without any additional tools, such as high frequency welding and hot air fusion machines.

Further aspects and advantages of the invention will become apparent from the following description of the invention.

Figure 1:
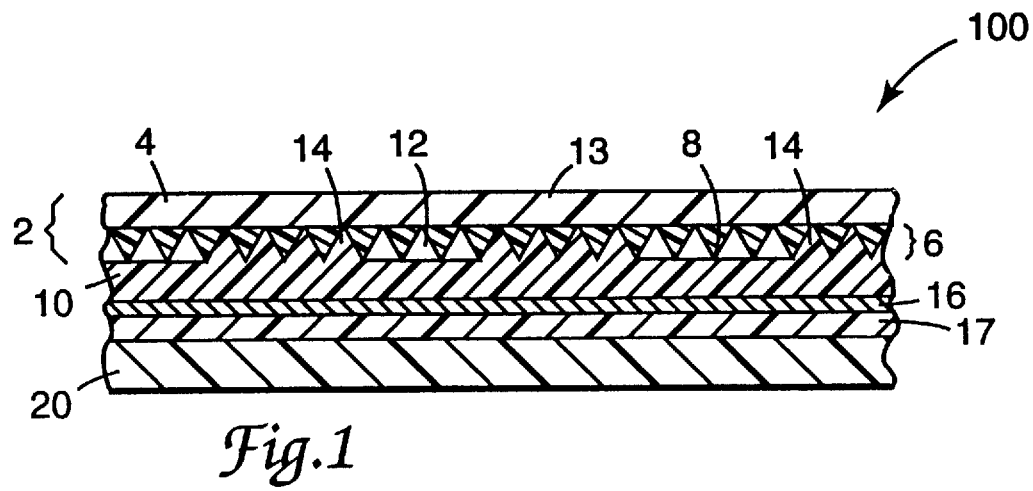
FIG. 1 is a cross-sectional view (enlarged) of an illustrative article of the invention, comprising the cube-corner retroreflective article adhered to a PVC component using an adhesive as described herein.

These figures are not to scale and are intended to be merely illustrative and non-limiting.

DESCRIPTION OF ILLUSTRATIVE EMBODIMENTS

The invention provides a retroreflective article comprising a highly monomericly plasticized PVC component adhered to an adherend by a pressure-sensitive adhesive (PSA). A highly monomericly plasticized PVC component comprises at least 10 percent by weight plasticizer. The articles of the invention, by virtue primarily of the adhesive, pass at least three rigorous tests, and preferably all tests, further described herein, which are used to determine if the articles will withstand static shear after water soaking, static shear after thermal conditioning, pressure washing, and the like, in a real world setting. Many previously known adhesives have not shown the ability to meet at least three (preferably four, most preferably all of these tests. Before discussing these tests and the pressure-sensitive adhesives, however, the inventive articles are described with reference to the drawing figures.

Retroreflective Articles

A. Articles incorporating Cube-corner Retroreflective Sheeting

One preferred embodiment of the articles of the present invention relates to a retroreflective article comprising a transparent retroreflective sheeting having a substantially flat first surface and a structured second surface bearing utilitarian structures, e.g., cube corner elements for retroreflection, typically covered by a sealing layer. In common embodiments, the structured second surface comprises a plurality of grooves defining a plurality of peaks ( in cube-corner sheeting at least two or three grooves intersect, whereas in prism films the grooves are parallel), a sealing film layer (colored or colorless) disposed in and bonded to a first portion of the grooves, a second portion of the grooves precluded from contact with the sealing film layer, and a pressure-sensitive adhesive layer (as herein described) disposed between the sealing film layer and a highly monomericly plasticized PVC component or substrate.

As used herein the term "peak" means a projection having at least two planar facets, such as prisms, pyramidal protrusions, cube-corner protrusions, and the like. The phrase does not include protrusions which do not include planar facets, such as protrusions present in holographic films.

The term "transparent retroreflective sheeting" means a sheeting transmitting at least 90% of incident light in the visible spectrum (about 400–700 nanometers wave length), as determined by a standard spectrophotometer.

Referring now to the Figures, wherein like numerals are used to denote like elements from figure to figure, a preferred embodiment of a cube-corner transparent retroreflective article of the invention is illustrated in cross-section (enlarged) in FIG. 1. In FIG. 1, sheeting 100 comprises a transparent layer 2 having a flat, smooth surface 4 and a structured surface 6 comprised of a plurality of peaks 8. Layer 2 may be extremely thin to enhance flexibility, or overlay 13 may have a low modulus as disclosed in assignee's copending U.S. patent application Ser. No. 08/326,696, filed Oct. 20, 1994 (now abandoned), incorporated by reference herein. In the '696 application, layer 2 is formed from a thermoplastic overlay film 13 and decoupled thermoset cube corner elements.

A thermoplastic sealing film layer 10 is disposed on peaks 8, and a plurality of air spaces 12 are defined between cube-corners and sealing film layer 10 so as to impart retroreflectivity to the article. Sealing film layer 10 is adhered to layer 2 at a plurality of sealing areas 14, where the thermoplastic sealing film material has flowed between individual cube corner elements to reach and fuse with the thermoplastic overlay film 13. The sealing prevents water, oil and the like from entering between sealing film layer 10 and layer 2.

In FIG. 1, reference numeral 16 denotes an optional chemical primer layer or a corona treatment layer positioned between sealing film layer 10 and a PSA layer 17. Chemical and/or physical priming is preferred but not necessary to the invention. The combination of layers consisting of layer 2, sealing film layer 10, and primer layer or corona treatment layer 16 is designated as a retroreflective sheeting adherend 18. A liner (not illustrated) is preferably positioned on the surface of PSA layer 17 so as to protect its surface prior to adhering to a highly monomericly plasticized PVC component 20.

Figure 2:
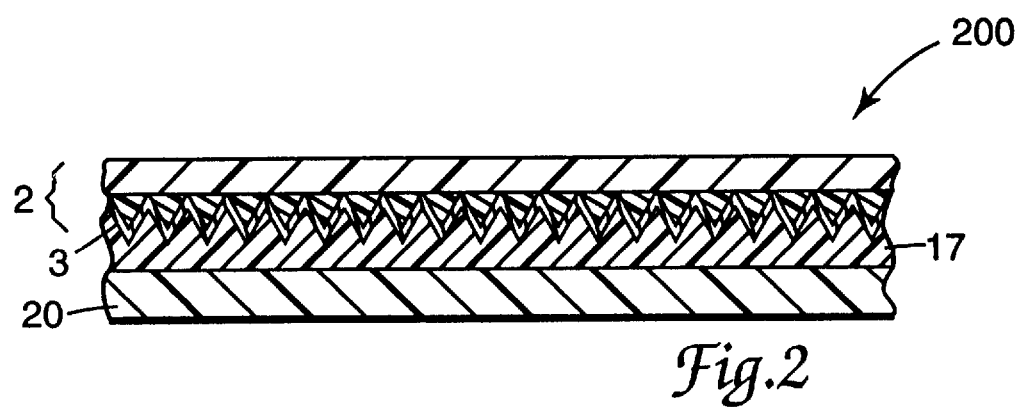
FIG. 2 is a cross-sectional view (enlarged) of an illustrative article of the invention, comprising the metallized layer of a cube-corner retroreflective article of adhered to a PVC component using an adhesive in accordance with the invention.

FIG. 2 illustrates another inventive article embodiment, respectively. FIG. 2 illustrates a cube-corner retroreflective sheeting 200, comprising layer 2 as in the embodiment illustrated in FIG. 1. However, embodiment 200 comprises a metal layer 3, which serves to reflect light incident upon layer 2. No sealing layer is present. FIG. 2 illustrates a layer of PSA 17 adhering a plasticized PVC component 20 to metal layer 3. This embodiment eliminates the need for a sealing film, but requires the PSA to be able to bond a plasticized PVC component to a metal surface.

Layer 2 may be any one of the cube-corner or substantially totally internal reflecting sheetings described in U.S. Pat. Nos. 3,140,340; 3,648,348; 4,576,850; 4,588,258; 4,775,219; 4,801,193; 4,805,984; 4,895,428; 4,906,070; 4,938,563; 5,056,892; 5,138,488; 5,175,030; and 5,183,597, all of which are incorporated herein by reference.

More specifically, layer 2 preferably comprises a large number of precisely shaped elements (preferably pyramidal, cube-corners or a series of parallel prisms), typically defined by grooves which define the elements. The pyramids, cube-corners, or prisms substantially totally reflect the light in a direction opposite to the incident direction. The precisely shaped elements define a plurality of pockets 11 (FIGS. 1 and 2), filled with air or other fluid. "Substantially totally internal reflecting" pertains to the optical quality of the film, and means that the film has a T-Test Value of 5% or less, wherein the T-Test is described as follows. The optical quality of a retroreflective film can be evaluated with apparatus including a laser (such as a Spectra-Physics Inc. Model 117A) with a spatial filter, a beam expander, and a collimator. Two diaphragms or irises are placed 18 and 38 cm from the laser, and an annular sample holder with an opening 6.35 cm in diameter is placed 84 cm from the laser. Directly behind the sample holder is an integrating sphere (with a 3 cm diameter aperture) and a LAB SPHERE ML-400 radiometer. Using the diaphragms or irises, the laser is focused through the aperture to obtain a clean circle of light of about 3 mm diameter on a black surface mounted on the sample holder. A source intensity measurement of 100% is taken with no sample in place. The TIRF to be tested is then mounted on the sample holder with its flat surface facing the laser and its grooves extending vertically. Unless otherwise reported, T-Test Values are measured at ambient temperature. Readings are then made at from 12 to 15 different points on the TIRF within a 5 cm diameter area while making sure that none of the light strikes the frame of the sample holder. The readings are averaged and multiplied by 100 to give percent transmission which is the T-Test Value of the TIRF sample. T-Test Value is a criterion of the fidelity of replication of the TIRF. Smaller T-Test Value percentages indicate better fidelity of replication than larger percentages, and a T-Test Value of 5% or less indicates that the film is substantially totally internal reflecting.

Layer 2 preferably comprises an acrylic material having excellent durability, such as poly(methyl)methacrylate, polyester (such as polyethylene terephthalate), poiyamide, polycarbonate, poly(vinylchloride), poly(vinylidenechloride), cellulose acetate butyrate, cellulose acetate propionate, poly(ethersulfone), polyurethane, ionomer resins (such as the metal ion crosslinked polyethylene/acrylic acid ionomers known under the trade designation SURLYN), and the like, and preferably also comprises a UV absorber.

From the aspects of mechanical strength and light reflectivity, layer 2 preferably has a refractive index of about 1.6, which is possible if the layer is made of a polycarbonate resin, an ionomer resin such as just described, or an acrylic resin.

Structured sheeting or layer 2 may be made as one integral material, e.g., by embossing a preformed sheet with a described array of cube-corner elements, or casting a fluid material into a mold; or they may be made as a layered product, e.g., by casting the elements against a preformed film as taught in U.S. Pat. No. 3,684,348, or by laminating a preformed film over the front face of individual molded elements. Polycarbonates and ionomers are preferred integral sheet materials.

The thickness of layer 2 preferably ranges from about 50 to about 500 micrometers in terms of the height from the apex of the pyramid or prism to the base of the base portion. If the thickness is less than 50 micrometers, the mechanical strength is not sufficient and a predetermined height is difficult to obtain for the pyramids or prisms, so that retroreflectivity decreases. If the thickness exceeds 500 micrometers, on the other hand, the total thickness of the retroreflective sheet becomes so thick that handling becomes difficult and the amount of adhesive required increases.

In the present invention, sealing film layer 10 (FIG. 1) is involved in exhibition of retroreflectivity by forming an air layer 12 between sealing film layer 10 and layer 2. In other words, in order for layer 2 to exhibit retroreflectivity, an air layer must exist below the precisely shaped elements so as to produce a change in refractive index. Sealing film layer 10 is laminated onto the structured surface of layer 2, and sealing film layer 10 is bonded thereto with heat and/or radiation at a plurality of locations, thus forming a plurality of sealed air pockets. It is understood that "air" is used only as an example and that other fluids may be used, depending on the atmosphere in which the articles of the invention are produced, and provided that the fluid used is significantly different in refractive index from layer 2 (a difference in refractive indices of 0.5 is preferred). The procedures of U.S. Pat. No. 4,025,159 (incorporated by reference herein) may be used to effect the bonding of sealing film layer 3 to the structured second surface of layer 2.

If water, oil or the like enters between layer 2 and sealing film layer 10, the refractive index changes and retroreflectivity is lowered. Accordingly, the sealing film layer has the seal effect for water and the like.

Sealing film layer 10 is preferably a plastic film-like article comprising a plastic resin, such as polyurethane, polyester, polyvinylchloride and the like, which may contain a predetermined amount of one or more pigments such as titanium dioxide (white), silica, red oxide, and the like, added to the resin. Particularly, white is suitable for the present invention because recognizability of the retroreflective articles of the invention is high.

B. Articles Employing Beaded Retroreflective Sheeting

Figure 3:
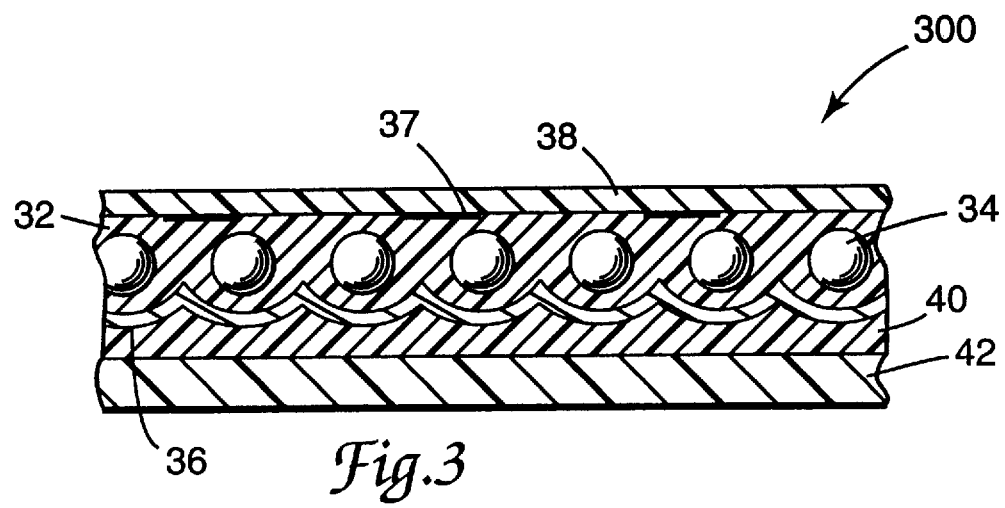
FIG. 3 is a cross-sectional view (enlarged) of an illustrative article of the invention comprising an embedded lens retroreflective substrate adhered to a PVC component using an adhesive in accordance with the invention.

FIG. 3 is a cross-sectional view (enlarged) of an illustrative article embodiment 300 of the invention comprising an embedded lens retroreflective adherend adhered to a PVC component using an adhesive in accordance with the invention. In this embodiment, the retroreflective sheeting substrate comprises a polyvinyl butyral layer 32 in which a plurality of glass microspheres 34 are embedded. Other organic layers, such as glyptal, alkyd, ethylene and/or propylene acrylic acid copolymers, ethylene methacrylic acid copolymer, ionomers, crosslinked and/or uncrosslinked aliphatic polyurethanes, vinyl, PMMA, and the like may also comprise layer 32. A cover material 38 is illustrated over printed indicia for abrasion resistance, chemical deterioration resistance, and the like, which would be desired by users of the inventive articles in prolonged (i.e., greater than 1 year) outdoor usage, such as license plates, highway signs, street signs, and the like. A reflective layer 36, PSA layer 40, and plasticized PVC component 42 complete the structure.

Preferred embedded lens retroreflective sheetings include those known under the trade designation SCOTCHLITE, particularly the 3700, 4200, and 5300 series, available from Minnesota Mining and Manufacturing Co., St. Paul, Minn., hereinafter 3M). Enclosed-lens retroreflective sheetings may also be used and are described in U.S. Pat. Nos. 2,407,680, 4,664,966 and 4,511,210, all incorporated herein by reference. Also useful retroreflective substrates are encapsulated-lens sheetings disclosed in U.S. Pat. Nos. 3,190,178; 4,025,159; 4,896,943; 5,064,272; and 5,066,098, all incorporated herein by reference.

Non-reflective Articles

As previously mentioned, non-reflective adherends may be adhered to highly monomericly plasticized PVC components or substrates using the inventive adhesive. Representative examples of suitable non-reflective adherends include those previously mentioned polymeric films including polyurethane films, polyolefin films, and plasticized vinyl films (such as described in U.S. Pat. No. 4,605,592, Paquette et al., previously incorporated herein by reference), or metallic films such as aluminum. Other adherends include one attachment sheeting of a hook and loop attachment system such as those known under the trade designations VELCRO and SCOTCHMATE, the latter available from 3M.

Printed Indicia

It should be noted that the articles of the invention may have human and/or machine readable indicia, such as desired alpha-numeric indicia, bar codes, logos and the like, printed on the exposed surface of the substrate (i.e. that surface of the substrate not having adhesive attached thereto), which may subsequently be buried beneath adhesive and cover film layers, such as described in the previously incorporated by reference PCT applications. The printed indicia may be printed using wax-based binder/colorants or resin-based binder/colorant layers in a thermal mass transfer process, such as disclosed in assignee's pending U.S. patent application Ser. Nos. 08/386,279 and 08/386,280 (now U.S. Pat. No. 5,706,133), both filed Feb. 9, 1995, and or printed using the dry toner powder procedures of U.S. Pat. No. 5,085,918 and pending U.S. patent application Ser. No. 08/335,468, filed Nov. 7, 1994 (abandoned in favor of Ser. No. 08/720,266, now U.S. Pat. No. 5,725,935), all of which are incorporated herein by reference.

Primer layer

The surface of retroreflective and non-retroreflective adherends which contacts the adhesive can be a wide variety of materials. Therefore, surface treatments may be necessary to secure better adhesion to the plasticized PVC component.

Particularly preferred thermoplastic resins for forming a sealing film layer are polyester and polyurethane resins. However, bonding of polyurethane and polyester films to adhesive layers is not easy and further, when processing aids are present on the films, they tend to migrate toward the interface between the adhesive and the film, weakening the bond. When the sealing film layer is primed either physically or chemically, however, these problems can effectively be overcome.

In the present invention, a chemical primer layer or a corona treatment layer is preferably disposed between sealing film layer 3 and PSA layer 5. When a chemical primer layer and/or corona treatment is employed, inter-layer adhesion between the sealing layer film 3 and PSA layer 5 can be improved, and thus high adhesion of the articles of the invention to a substrate is possible.

Suitable chemical primer layers may be selected from urethanes, silicones, epoxy resins, vinyl acetate resins, ethyleneimines, and the like. The urethane and the silicone types are particularly effective chemical primers for polyester colored sealing film layers. Among the silicone type, the primer layer having a continuous gelled network structure of inorganic particles, which is described in Japanese Unexamined Patent Publication (Kokai) No. 2-200476, is suitable for the present invention. This is because it has particularly remarkable affinity for polyester resins and polyolefin resins. Examples of chemical primers for vinyl and polyethylene terephthalate films include crosslinked acrylic ester/acrylic acid copolymers disclosed in U.S. Pat. No. 3,578,622.

The thickness of the chemical primer layer is suitably within the range of 10 to 3,000 nanometers (nm). If the thickness is less than 10 nm, the primer effect is minimal and if it exceeds 3,000 nm, on the other hand, inter-layer peel is likely to occur in the primer layer.

Corona treatment is a preferred physical priming that can be suitably applied to the unexposed surface of the adherend onto which is then coated the adhesive of the present invention. Corona treatment improves the inter-layer adhesion between the adhesive and the adherend. Corona treatment of films is a well-known technique, and is described generally in Cramm, R. H., and Bibee, D. V., *The Theory and Practice of Corona Treatment for Improving Adhesion*, TAPPI, Vol. 65, No. 8, pp 75–78 (August 1982), and in U.S. Defensive publication H 688, published Oct. 3, 1989, both incorporated herein by reference.

Pressure-sensitive Adhesives

Adhesives useful in the invention are pressure sensitive and preferably possess good initial tack (sometimes referred to as "preadhesion"), thus providing easy application of retroreflective sheeting onto monomericly plasticized PVC components.

The PSAs should have acceptable performance after absorption of plasticizer. During summer, the temperature on the PVC canvas side of a truck trailer could conceivably reach as high as 130° F. (54° C.) which would enhance the migration of the plasticizer into the adhesive.

Further, the PSAs preferably have acceptable performance at low application temperatures. The PSAs preferably may be applied to a substrate, such as a side of a PVC canvas truck trailer, at temperatures ranging at least down to 10° C.

The PSAs should have acceptable performance after exposure to water or moisture. Under rainy conditions, water could be present at the interface between the retroreflective sheeting and the PVC coated fabric material. Water would have a greater effect on the performance of the adhesive if it contained more hydrophilic components.

Further, there is preferably no uniform lifting of the retroreflective sheeting during conditions of stress, such as when attached to curtain-sided truck trailers to be opened and closed. Truck trailers would need frequent washing due to the extensive amount of time spent on the road under a wide variety of conditions. The ability of the adhesive to withstand delamination during pressure washing is important.

A. Primary Acrylic acid and meth(acrylic) acid esters

The acrylic copolymers useful in the adhesive of the invention preferably contain from about 50 to about 90 parts per hundred parts by weight monomer, more preferably about 60 to about 80 parts per hundred parts monomer, contained in the copolymer of at least one monomer selected from the group consisting of a first monofunctional acrylate or methacrylate ester of a non-tertiary alkyl alcohol, the alkyl group of which comprises from 4 to about 12 carbon atoms, and mixtures thereof. Such acrylate or methacrylate esters generally have, as homopolymers, glass transition temperatures below about −25° C. Higher amounts of this monomer relative to the other comonomers affords the PSA with higher tack at low temperature, while lower than about 50 weight percent of this monomer reduces or completely eliminates the pressure-sensitivity of the adhesive.

Preferred acrylate or methacrylate ester monomers include but are not limited to those selected from the group consisting of n-butyl acrylate (BA), n-butyl methacrylate, isobutyl acrylate, 2-methyl butyl acrylate, 2-ethylhexyl acrylate, n-octyl acrylate, isooctyl acrylate (IOA), isooctyl methacrylate, isononyl acrylate, isodecyl acrylate, and mixtures thereof.

Particularly preferred acrylates include those selected from the group consisting of isooctyl acrylate, n-butyl acrylate, 2-methyl butyl acrylate, 2-ethylhexyl acrylate, and mixtures thereof.

B. Basic Monomers

Basic copolymerizable monomers are required in the PSAs useful in the invention to enhance both the basic character and the shear strength of these adhesives.

Preferred copolymerizable basic polar monomers include moderately basic N,N-dialkyl substituted amides. Examples of useful moderately (di-substitution on the nitrogen with an electron-donating group yields a moderate base) basic copolymerizable monomers include N,N-dimethyl acrylamide (NNDMA), N,N-dimethyl methacrylamide, N,N-diethyl acrylamide, N,N-diethyl methacrylamide and the like. Weakly (mono-substitution on the nitrogen with an electron-donating group yields a weak base) basic copolymerizable monomers, such as N-octyl acrylamide can be used in combination with a major amount (i.e., at least 10 weight percent) of moderately basic monomer. Strongly basic monomers (monomers having non-sterically hindered tertiary amine terminal groups) such as N,N-dimethylaminoethyl methacrylate, N,N-dimethylaminopropyl methacrylate, N,N-dimethylaminoethyl acrylate, N,N-dimethylaminopropyl acrylate, and the like, were found to be too basic when used as the sole basic monomer, actually dehydrochlorinating PVC upon aging and thereby possibly shortening the useful life of PVC coated fabric and other PVC components. If strongly basic monomers are employed, such as N,N-dimethylaminoethyl methacrylate, it is preferred that these monomers be present in a minor amount (i.e., up to 3 weight percent of the total monomer) and used in conjunction with a major amount (i.e., at least 10 weight percent) of a moderately basic monomer. Particularly preferred are moderately basic polar monomers, alone or in combination with other basic monomers.

Preferably, PSAs of the present invention comprise from about 10 to about 25 parts by weight of moderately basic copolymerizable monomer. Exemplary mechanical test results are obtained when there is present from about 10 to about 15 parts by weight moderately basic copolymerizable monomers, particularly in conjunction with about 60 to about 80 parts by weight isooctyl acrylate and/or n-butyl acrylate as the low $T_g$ monomer, and about 5 to about 6 parts by weight acrylic acid.

Particularly preferred basic copolymerizable monomers are represented by general Formula (I). Examples of specific Z groups include but are not limited to those selected from the group consisting of —C(=O)N(CH$_3$)$_2$ and —C(=O)N(C$_2$H$_5$)$_2$.

The basicity of the nitrogen containing monomers utilized in the present invention is defined by their substitution. $R^1$ and/or $R^2$ may in certain situations represent an electron donating group. Substituents that increase the electron density on a nitrogen by field effects or resonance in the case of aromatic bases will increase the basicity of nitrogen. The higher the degree of substitution on the nitrogen by linear or branched alkyl groups, the higher the basicity of the monomer. Conversely, substituents which decrease the electron density on the nitrogen of a basic copolymerizable monomer, such as a phenyl group will reduce the basicity of the monomer.

Using these general principles, several common basic copolymerizable monomers possess the following ascending order of basicity: Acrylamide<N-methyl acrylamide<N,N-dimethyl acrylamide<3-(3-pyridinyl)propyl acrylate<N,N-(dimethylamino)ethyl acrylate.

In addition to these substituent effects on the basicity and usefulness of these monomers in the pressure-sensitive adhesive of the present invention, it is also important to prevent or minimize sterical hindrance of the nitrogen in the basic copolymerizable monomer. As such, examples of non-sterically hindering electron donating groups present in the non-sterically hindered group Z defined above are —CH(R$^4$)$_2$; —CH$_2$(R$^4$); and CH$_3$ (i.e., not —C(R$^4$)$_3$) wherein R$^4$ represents an alkyl group, typically an alkyl group comprising about 1 to about 6 carbon atoms. R$^4$ cannot be a tertiary alkyl group or a cycloaliphatic group (i.e., R$^4$ can be n-alkyl and sec-alkyl). Two R$^4$ groups cannot combine to form a cyclic group. Other non-sterically hindering electron donating groups R$^1$ and R$^2$ including those selected from the group consisting of —CH$_2$CH$_2$OCH$_3$, —CH$_2$OCH$_2$CH$_3$, and —CH$_2$OCH$_3$, can also be useful.

When Z represents a monovalent aromatic radical, substituents on the basic nitrogen-containing ring structure which increase the electron density on the basic nitrogen (i.e., electron donating substituents such as alkyl or alkoxy groups) enhance the basicity of these types of basic copolymerizable monomers. Electron withdrawing substituents on the basic nitrogen-containing ring structure, such as halogens, —COOH, —NO$_2$, and the like, decrease the electron density on these aromatic nitrogens and correspondingly, their basicity. Additionally, similar to the case when

represents —N—R$^1$, sterical hindrance of such aromatic basic nitrogens by constraint of and/or the presence of bulky substituents such as a tert-butyl group on the basic nitrogen-containing ring structure must be minimized or prevented.

Particularly preferred copolymerizable N,N di-substituted amides include those selected from the group consisting of N,N-dimethyl acrylamide, N,N-dimethyl methacrylamide, N,N-diethyl acrylamide, N,N-diethyl methacrylamide, and mixtures thereof.

C. Acidic Monomers

Depending on its basicity, the amount of copolymerizable basic monomer (i.e., N,N di-substituted amides) used is from about 10 to about 25 parts per hundred parts of the final copolymer. As long as a molar excess of the copolymerizable basic monomer is maintained, low levels (typically 0 to about 7 parts by weight, more preferably from about 3 to about 6 parts by weight, most preferably about 5 to about 6 parts by weight) of an acidic monomer such as a carboxylic acid can be used to increase the cohesive strength of the pressure-sensitive adhesive. At higher levels, this copolymerizable acidic component tends to diminish the tack as well as adversely affect the water soak performance of the pressure-sensitive adhesive of the present invention.

Useful copolymerizable acidic monomers include but are not limited to those selected from the group consisting of ethylenically unsaturated carboxylic acids, ethylenically unsaturated sulfonic acids, and ethylenically unsaturated phosphoric acids. Examples of such compounds include those selected from the group consisting of acrylic acid (AA), methacrylic acid, itaconic acid, fumaric acid, crotonic acid, citraconic acid and maleic acid, β-carboxyethyl acrylate, sulfoethyl methacrylate, and the like, and mixtures thereof.

D. Secondary Acrylate Monomers

As previously mentioned, PSAs useful in the invention preferably exhibit acceptable performance on water soaking, which may be problematic if hydrophilic monomers are present. Therefore, from 0 to about 30 weight percent of a hydrophobic monomer having as a homopolymer a $T_g$ greater than $-25°$ C., may be substituted for or partially replace hydrophilic monomers such as acrylic acid. Useful secondary acrylate monomers include isobornyl acrylate (IBA), ethyl acrylate, methyl acrylate, vinyl acetate, and the like.

E. Crosslinking Agents

The crosslinking agent is an organic compound which reacts with the other monomers by virtue of having a plurality of ethylenically unsaturated groups. These compounds are referred to as multifunctional acrylates herein. Alternatively, a crosslinking agent is a compound which can directly react with the polymeric backbone and result in crosslinking, for example, peroxide thermal cure or benzophenone UV cure.

A crosslinking agent is present in an amount of from about 0.05 to about 1 percent by weight in the pressure-sensitive adhesive of the present invention based upon the total weight of the monomers employed.

The crosslinking agents are selected according to the polymerization method employed. Preferred crosslinking agents for the PSAs prepared via photopolymerization on web are multifunctional acrylates such as 1,6-hexanediol diacrylate (HDDA) as well as those disclosed in U.S. Pat. No. 4,379,201 (Heilmann et al.), incorporated by reference herein, such as trimethylolpropane triacrylate, pentaerythritol tetraacrylate, 1,2-ethylene glycol diacrylate, and 1,12-dodecanediol diacrylate.

Additional useful crosslinking agents include hydrogen abstraction type photocrosslinkers such as those based on benzophenones, acetophenones, anthraquinones, and the like. These crosslinking agents can be copolymerizable or non-copolymerizable. Examples of non-copolymerizable hydrogen abstraction crosslinking agents include benzophenone; radiation-activatable crosslinking agents such as those described in U.S. Pat. No. 5,407,971, incorporated by reference herein, within the general formula

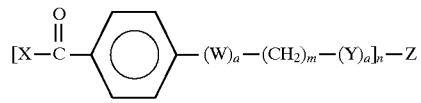

wherein W represents —O—, —N—, or —S—, X represents $CH_3$— or phenyl, Y represents a ketone, ester, or amide functionality, Z represents a polyfunctional organic segment that does not contain hydrogen atoms that are more photoabstractable than hydrogen atoms of a polymer formed using the crosslinking agent; m represents an integer from 0 to 6, a represents 0 or 1, and n represents an integer of 2 or greater; and anthraquinones, while examples of copolymerizable hydrogen abstraction initiator compounds include monoethylenically unsaturated aromatic ketones, particularly 4-acryloxybenzophenone (ABP), as described in U.S. Pat. No. 4,737,559 (Kellen et al.), incorporated herein by reference.

In addition, copolymerizable α-cleavage photoinitiators can be employed, such as acrylamido-functional di-substituted acetyl aryl ketones (such as those described in U.S. Pat. No. 5,506,279, incorporated herein by reference).

In addition, combinations of multi-functional (meth) acrylates and the hydrogen abstraction type crosslinkers or copolymerizable α-cleavage photo initiators can be used. Low intensity UV light, such as "UV black light", is sufficient to induce crosslinking in most cases; however, when hydrogen abstraction type crosslinkers are used by themselves, high intensity UV exposure (such as by a mercury lamp processor such as those available from PPG, Aetek and others) is necessary to achieve sufficient crosslinking at high line speeds.

Yet, another method for crosslinking (not necessarily requiring addition of crosslinking agents) is by exposure to an electron-beam.

Other useful crosslinking agents include the substituted triazines, such as those disclosed in U.S. Pat. Nos. 4,329,384 and 4,330,590 (Vesley), both incorporated herein by reference, e.g., 2,4-bis(trichloromethyl)-6-p-methoxystyrene-5-triazine and the chromophore halomethyl-5-triazines.

Crosslinking agents useful in solution polymerized PSAs useful in the invention are those which are free radically copolymerizable and which effect crosslinking through exposure to radiation, moisture or heat following polymerization. Such crosslinkers include the above mentioned photoactive substituted triazines and hydrogen abstraction type photocrosslinkers. Hydrolyzable, free radically copolymerizable crosslinkers, such as monoethylenically unsaturated mono-, di- and trialkoxy silane compounds including but not limited to methacryloxypropyltrimethoxysilane (sold under the tradename "Silane A-174" by Union Carbide Chemicals and Plastics Co.), vinyldimethylethoxysilane, vinylmethyldiethoxysilane, vinyltriethoxysilane, vinyltrimethoxysilane, vinyltriphenoxysilane, and the like are also useful crosslinking agents.

Heat activated copolymerizable crosslinking agents, including but not limited to N-methylol acrylamide and acrylamido glycolic acid, can also be used to enhance the shear strength of the pressure-sensitive adhesive composition of the invention.

Bisamide crosslinking agents may also be employed. Bisamide crosslinking agents are more fully described as compounds within the general formula (I):

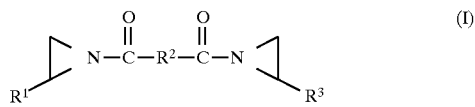

wherein $R^1$ and $R^3$ are the same or different and are independently selected from the group consisting of H and $C_nH_{2n+1}$, wherein n is an integer ranging from 1 to about 5, and $R^2$ is a divalent radical selected from the group consisting of benzeno (—$C_6H_4$—), substituted benzeno, triazine, and $C_mH_{2m}$, where m is an integer ranging from 1 to about 10. An example of a useful bisarnide within general formula I is N,N'-bis-1,2-propyleneisophthalamide, which has the following structure (general formula II):

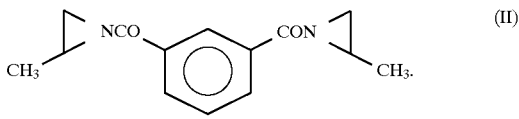

F. Initiators

Suitable thermal free radical initiators which may be utilized include but are not limited to those selected from the group consisting of azo compounds such as 2,2'-azobis (isobutyronitrile), hydroperoxides such as tert-butyl hydroperoxide, and peroxides such as benzoyl peroxide and cyclohexanone peroxide. Photoinitiators which are useful according to the invention include but are not limited to those selected from the group consisting of benzoin ethers such as benzoin methyl ether or benzoin isopropyl ether, substituted benzoin ethers such as anisole methyl ether, substituted acetophenones such as 2,2-diethoxyacetophenone and 2,2-dimethoxy-2-phenyl acetophenone, substituted alpha ketols such as 2-methyl-2-hydroxy propiophenone, aromatic sulfonyl chlorides such as 2-naphthalene sulfonyl chloride, and photoactive oximes such as 1-phenyl-1,1-propanedione-2-(0-ethoxycarbonyl)-oxime. For both thermal and radiation induced polymerizations, an initiator is present in an amount of about 0.01 to about 0.5 percent by weight based upon the total weight of the monomers of the instant pressure-sensitive adhesive compositions.

G. Glass transition temperature

The glass transition temperature ($T_g$) of adhesives useful in the present invention is typically within the range of about −10° C. to about 10° C., preferably within about −10° C. to about 5° C., most preferably from about −5° C. to about 0° C. When $T_g$ is lower than −10° C., preadhesion (tack) tends to become excessively high, and when $T_g$ exceeds 10° C., on the contrary, preadhesion tends to become too low. Furthermore, $T_g$ values in these preferred ranges allow the adhesive to possess good peel strength even after absorption of monomeric plasticizer from the PVC component. This upper Tg limit is preferable because when the adhesive absorbs plasticizer, the Tg is lowered thereby reducing peel strength.

For low temperature application embodiments, preferably the PSA is optimized such that the Tg of the adhesive is as high as possible to meet the bonding requirements at 10° C. while maintaining other physical properties necessary for performance.

The term "glass transition temperature" ($T_g$) of adhesives useful in the invention means a measurement value determined through the use of dynamic mechanical analysis (DMA) using a Bohlin VOR rheometer. For each adhesive sample, the oscillation experiment yielded the storage (G') and loss shear relaxation moduli (G") as a function of frequency and temperature. The parallel plates used were 1 inch (2.54 cm) in diameter. The thickness of the adhesive samples ranged from 0.5 to 2 mm. For each sample tested, the first set of measurements were taken at 25° C. Using liquid nitrogen, measurements were taken starting at 10° C. down to −40° C. at 10° increments. There was roughly a 15 minute interval between measurements at different temperatures to allow the adhesive sample to relax and attain equilibrium at the set temperature. At each temperature, the frequency sweeps ranged from 0.063 to 63 rad/sec. The normal force was held constant and the torque was about 20 gm-cm. For every sample, G' and G" were obtained at each temperature. The ratio (G"/G'), a unitless parameter typically denoted "tan δ", was plotted versus temperature. The maximum point (point where the slope was zero) in the transition region between the glassy region and the rubbery region of the tan δ curve, if well defined, determined the $T_g$ of the adhesive.

The adhesives of the present invention are particularly suitable for application to a truck canvas at low temperatures (i.e., 10° C.). Because sheeting or substrates are often applied to a truck canvas outdoors, a suitable adhesive should be capable of being applied at a range of temperatures such as 10° C. to 40° C.

To achieve desired physical properties, the adhesive preferably comprises 10 to 15 parts (more preferably 10 to 12 parts if 6 parts of acidic monomer and 13 to 15 parts if 5 parts of acidic monomer) NNDMA or other N,N-dialkyl substituted amides and 5 to 6 parts of an acidic monomer.

H. Polymerization Methods

Adhesives useful in the invention can be polymerized by conventional free radical polymerization methods, whether thermally or radiation initiated, including solution and bulk polymerization processes.

In one solution polymerization method, the acrylate ester component, basic copolymerizable component and acidic polar component along with a suitable inert organic solvent and free radically copolymerizable crosslinker are charged into a four-neck reaction vessel which is equipped with a stirrer, a thermometer, a condenser, addition funnel and a thermowatch. After this monomer mixture is charged into the reaction vessel, a concentrated thermal free radical initiator solution is added to the addition funnel. The whole reaction vessel and addition funnel and their contents are then purged with nitrogen to create an inert atmosphere. Once purged, the solution within the vessel is heated to about 55° C., the initiator is added, and the mixture is stirred during the course of the reaction. A 98 to 99 percent conversion should be obtained in about 20 hours.

Another polymerization method is a two step ultraviolet (UV) radiation initiated photopolymerization of a 100% solids monomer mixture. In the first step, the low viscosity monomers are mixed at the appropriate ratios and a photoinitiator is added to the mixture. The mixture is purged with nitrogen to remove dissolved oxygen. Short exposure to UV light results in a partially polymerized syrup with moderate viscosity that can be coated easily. Further photoinitiator and crosslinker are added to the syrup. The syrup is then coated (while excluding $O_2$) at a desired thickness, usually about 0.5 to 10 mils (about 0.01 to 0.25 millimeters). During the coating process, the syrup is further exposed to a bank of UV lights to complete the polymerization and crosslink the adhesive.

An alternative to the above two step method involves the use of an extruder. In this method, a plastic pouch is filled with monomers and initiators (i.e., precursor), with the addition of chain transfer agents to keep the molecular weight low enough after polymerization so that the polymer can be extruded. The pouch material typically is selected from the group consisting of ethylenevinyl acetate, ethylene-acrylic acid, polypropylene, polyethylene, polybutadiene, and ionomeric films. The filled pouch is exposed to UV, which produces the polymerized composition inside the pouch. The pouch and contents are then fed to the extruder and the resulting molten composition hot melt coated onto a liner, after which it is then exposed again to UV or electron beam to crosslink the adhesive, to yield a composition comprising a high molecular weight PSA having a small percentage of pouch plastic polymer material therein, typically 3 weight percent or less.

Reactive extrusion, such as the continuous free radical polymerization methods described in U.S. Pat. Nos. 4,619, 979 and 4,843,134 (both Kotnour et al.), both incorporated herein by reference, may also be utilized to prepare PSAs useful in the invention. Reactive extrusion is a solventless technology where the polymerization is initiated by thermal means as opposed to UV radiation. The monomers along with the initiator are fed to an extruder. The temperature along the extruder is varied to control the polymerization. Chain transfer agents are added to control the molecular weight and prevent gel formation. The adhesive obtained at the end of the extruder is hot melt coated and cured either by UV light or electron beam in order to improve its cohesive strength.

I. Solvents and Optional Adhesive Ingredients

Suitable inert organic solvent, if required, may be any organic liquid which is essentially inert to the reactants and product and will not otherwise adversely affect the reaction. Such solvents include ethyl acetate, acetone, methyl ethyl ketones, and mixtures thereof. The amount of solvent is generally about 30–80% by weight based on the total weight of the reactants (monomer, crosslinker, initiator) and solvent.

Other useful materials which can be blended into the pressure-sensitive adhesive layer include, but are not limited to those selected from the group consisting of fillers, pigments, woven and nonwoven fabrics, antioxidants, stabilizers, fire retardants, and viscosity adjusting agents.

PVC Components

There are many types of monomericly plasticized PVC component materials, including: PVC coated fabric; vinyl films containing as much as 25 to 100 parts of monomeric plasticizer (usually dioctylphthalate) to 100 parts vinyl resin; and vinyl coated papers and scrims. Other substrates include PVC substrates such as those mentioned in Japanese published Kokai Nos. 5-263055, 5-140523 and 5-105857, incorporated by reference herein. The '055 publication describes soft vinyl chloride resins containing a metal type stabilizing agent, while the '523 publication describes soft vinyl chloride resins containing an epoxy radical. The '587 publication describes plasticized PVC, wherein the plasticizer is one or more of those listed below.

The primary component of monomericly plasticized PVC coated fabric is of course polyvinyl chloride. Some PVC coated fabrics have an acrylate or methacrylate copolymer added to PVC. The PVC coated fabrics primarily differ in the type and amount of plasticizer added to the polyvinyl chloride. They may also differ in their weight; the most common PVC coated fabric is an 18 oz. per sq. yd. version (610 grams per sq. meter or "gsm"), with the base fabric (usually woven nylon, polyester, or weft inserted fabric) generally weighing from about 5 to about 10 oz. per sq. yd. (about 170 to about 340 gsm), more typically from about 5 oz. per sq. yd. to about 7 oz. per sq. yd. (about 170 to about 240 gsm). The heavier base fabrics are used in heavyweight truck tarpaulins, which may have a weight of up to 25 oz. per sq. yd. (about 850 gsm). Lighter weight fabrics in the 1 oz. to 14 oz. per sq. yd range (about 30 to about 475 gsm) are also within the invention, and are used in applications where weight is important and other physical properties, such as abrasion resistance, are not as important.

As stated previously, both truck covers and tarpaulins are within the invention, including mesh type truck covers, which are light in weight, generally about 5 to about 10 oz. per sq. yd. (about 170 to about 340 gsm).

A study identified the PVC canvas known under the trade designation DURASKIN, style no. B156035, available from Verseidag-Indutex GmbH, Krefeld, Germany as having a high percentage of monomeric plasticizer. A GC and IR analysis of this blue-colored PVC coated fabric revealed that the PVC coating contained about 40 weight percent monomeric plasticizer.

It is theorized that highly monomericly plasticized PVC component materials may contain one or more of the following monomeric plasticizers: phthalic acid derivatives such as dimethyl phthalate, dibutyl phthalate, diethyl phthalate, diheptyl phthalate, di 2-ethylhexyl phthalate, diisooctyl phthalate, di n-octyl phthalate, dinonyl phthalate, diisononyl phthalate, diisodecyl phthalate, diundecyl phthalate, dilauryl phthalate, ditridecyl phthalate, diisobutyl phthalate, dibenzyl phthalate, butylbenzyl phthalate, dicyclohexyl phthalate, dimethoxyethyl phthalate, dibutoxyethyl phthalate, dimethylcyclohexyl phthalate, octyldecyl phthalate, octylbenzyl phthalate, n-hexyl n-decyl phthalate, n-octyl n-decyl phthalate; phthalic isomeride series such as dimethyl isophthalate, dioctyl isophthalate, di 2-ethylhexyl terephthalate; tetrahydrophthalic acid derivatives such as di 2-ethylhexyl tetrahydrophthalate, di n-octyltetrahydrophthalate; phosphoric acid derivatives such as tricresyl phosphate, trioctyl phosphate, triphenyl phosphate, octyldiphenyl phosphate, cresyldiphenyl phosphate, trichloroethyl phosphate, bisphenol A diphenyl phosphate, bisphenol A dixylenyl phosphate; adipic acid derivatives such as dimethyl adipate, dibutyl adipate, diisodecyl adipate, diisobutyl adipate, diisononyl adipate, di 2-ethylhexyl adipate, di n-octyl adipate, didecyl adipate, n-octyl n-decyl adipate, n-hepthyl n-nonyl adipate, benzyloctyl adipate, dibutyldiglycol adipate; sebacic acid derivatives such as di n-butyl sebacate, di n-octyl sebacate, diisooctyl sebacate, di 2-ethylhexyl sebacate, butylbenzyl sebacate; azaleic acid derivatives such as di 2-ethylhexyl azelate, di n-hexyl azelate, dimethyl azelate, dibenzyl azelate, dibutoxyethyl azelate, diisooctyl azelate; citric acid derivatives such as triethyl citrate, acetyltriethyl citrate, tributyl citrate, acetyltributyl citrate, acetyltrioctyl citrate; epoxy derivatives such as epoxidified soybean oil; polyesters such as polypropylene adipate, polypropylene sebacate; chlorinated materials such as chlorinated paraffin and chlorinated fatty acid ester; glycolic acid derivatives such as methylphthalyl ethylglycolate, ethylphthalyl ethylglycolate, and butylphthalyl butylglycolate; trimellitic acid derivatives such as tri 2-ethylhexyl trimellitate and tri n-octyl n-decyl trimellitate; ricinoleic acid derivatives such as methylacetyl ricinolate and butylacetyl ricinolate; butyloleate; petroleum resin mineral oils such as paraffin series process oils, aromatic series process oils, specialized process oil, ethylene and $\alpha$-olefin oligomer, paraffin wax, fluid paraffin, white oil, petrolatum, petroleum sulfonic acid, petroleum sulfonate, petroleum asphalt, and petroleum resin; vegetable oils such as castor oil, cottonseed oil, soybean oil, coconut oil, peanut oil, Japan wax rosin, pine oil, dipentene, pine tar softener, tall oil, purified tall oil; aliphatic acid and aliphatic acid salts such as ricinoleic acid, palmic acid, barium stearate, calcium stearate, magnesium stearate, and zinc stearate. Among these compounds, one or more can be used. These plasticizers are generally used in weight percentages ranging from about 10 to 50 percent by weight of the total weight of PVC coated fabric.

It is theorized that retroreflective sheeting may be effectively adhered to materials other than plasticized PVC canvas using the adhesives of the invention, such as polyvinylidene chloride, polyvinyl acetate, polystyrene, PMMA, polyacetyl, polycarbonate, polyamide, acetylcellulose, fluoroplastic, automotive paints, and the like.

Examples and Test Methods

The invention will be described more concretely with reference to the following nonlimiting examples and test methods. All parts, percentages, and ratios are by weight unless otherwise specified.

| Abbreviations and Trade names | |
|---|---|
| EA | ethyl acrylate |
| EHA | 2-ethyl hexyl acrylate |
| CA 2 | an acrylic solvent based adhesive known under the trade designation AEROSET 1845, from Ashland Chemical Co., Columbus, OH. |
| CA 3 | an adhesive comprising 93/7 IOA/AA crosslinked with N,N'-bis-1,2-propyleneisophthalamide |
| CA 4 | an adhesive blend of 65% of an acrylic latex (80/16/4 EA/BA/AA) and 35% of a urethane latex known under the trade designation BAYBOND 402a thickened with a thickener known under the trade designation QR0708, from Rohm and Haas, as generally described in Examples 1–8 of U.S. Pat. No. 5,229,207 |
| CA 5 | a acrylic transfer adhesive known under the trade designation 9465, available from 3M, comprising IOA/NVP/AA with diisononyl phthalate (DINP) plasticizer, as described in U.S. Pat. No. 4,985,488. |
| IBA | isobornyl acrylate |
| KB-1 | benzildimethylketal, available from Sartomer under the trade designation ESCACURE KB-1 |
| AA | acrylic acid |
| BA | n-butyl acrylate |
| IOA | isooctyl acrylate |
| HDDA | 1,6-hexanediol diacrylate |
| hr. | hour |
| min. | minutes |
| NNDMA | N,N-dimethyl acrylamide |
| R.T. | room temperature (about 20–25° C.) |
| PVC/CF | the PVC coated fabric known under the trade designation DURASKIN, style no. B 156035 |
| ABP | 4-acryloxybenzophenone |
| ANT | anthraquinone |
| CPIA | an acrylamido functionai di-substituted acetyl aryl ketone |
| IOTG | Isooctyl Thioglycolate, available from Witco, Greenwich, CT. |

TEST METHODS

Static Shear Test

This test is conducted in accordance with PSTC-7, a procedure specified in "Test methods for Pressure-Sensitive Tapes," 8th edition, available from the Pressure-Sensitive Tape Council, Glenview, Ill., U.S.A. A 12.7 mm×10 cm strip of the adhesive to be tested was applied to a sealing film. This was placed on a vertical PVC coated fabric test panel so that 12.7 mm×25.4 mm of adhesive is in contact. A hand roller was used to establish good contact between the adhesive, sealing film and PVC coated fabric test panel. These samples were conditioned in a constant temperature (R.T.) and relative humidity (about 50%) (CTRH) room for 24 hrs. At this stage, a 1 kg load was attached to a free end of the sealing film and the time to failure was noted. The samples that failed were examined for the mode of failure. The test is typically used to determine the cohesive strength of the adhesive under shear at room temperature. However, if the adhesion to the adherend or backing is poor or the adhesive is over/cross-linked, the failure is adhesive in nature. If no failure had occurred in 10,000 minutes, the test was discontinued. In addition, the samples were thermally conditioned at 158° F. (70° C.) for 1 week and tested for their shear performance at room temperature using the same procedure.

Pressure Wash Test

This test was in accordance with a General Motors Standard No. 9531P, March 1989, to test the ability of a conspicuity sheeting to withstand high pressure car wash spray. A 25.4 mm×50.8 mm strip of the adhesive was laminated to the sealing film of a cube-corner retroreflective sheeting and this was applied to a PVC coated fabric test sample. A hand roller was used to establish good contact between the adhesive and the PVC coated fabric. The samples were conditioned in a constant temperature and relative humidity (about 50%) (CTRH) room for 24 hrs. Half of the samples were placed in an oven for thermal conditioning at 158° F. (70° C.) for 1 week and the other half in a distilled water bath at R.T. for 10 days for water soaking. Upon removal, the samples were placed in a fixture such that the bottom of the sheeting was 212 mm away from a R.T. or cooler water spray nozzle and the top was tilted at a 45° angle away from the water spray. The water spray was directed at the base of the sheeting for 15 seconds at a pressure of around 8500 kPa. At the end of the test, the sheeting bottom was evaluated for lifting away from the PVC. If the lifting was less than 1 mm, it was assigned a pass rating. The article was judged to have failed the pressure wash test if the sheeting lifted greater than 1 mm uniformly.

T-peel Test

A 25.4 mm×152.4 mm strip of adhesive was laminated to the sealing film of a cube-comer retroreflective sheeting and this was applied in partial overlapping fashion to a similar sized PVC coated fabric such that an end portion of the PVC coated fabric was free of adhesive. A hand roller was used to establish good contact between the adhesive, the sealing film and the PVC coated fabric. The samples were conditioned in a constant temperature (R.T.) and relative humidity (50%) (CTRH) room for 24 hrs. The sheeting-adhesive-PVC coated fabric sandwich is termed the composite. The following peel tests were performed to test the adhesive performance:

a) Peel after the 24 hour dwell in the CTRH;

b) Peel after thermal conditioning by placing the composite in an oven at 158° F. (70° C.) for 1 week;

c) Peel after placing the composite in a distilled water bath at R.T. for 10 days for water soaking.

After conditioning, the composite was placed in a tensile testing machine known under the trade designation SIN-TECH such that the end of the sheeting with the adhesive was clamped in the upper jaw and the end comprised only of PVC coated fabric was clamped in the lower jaw. The jaws were then separated at 30.5 cm/minute and the force required to effect the separation was noted in $lb_f$/in. The original adhesive thickness was 0.127 mm.

EXAMPLES

Examples 1–4 and Comparative Examples C-1–C-5

Example 1

A mixture of 80 parts IOA, 15 parts of the moderately basic copolymerizable monomer NNDMA, 5 parts AA, 0.10 part KB-1 was inerted and partially photopolymerized under low intensity ultraviolet (UV) irradiation (40 watt fluorescent black lamp having 90% of the emissions between 300 and 400 nm and a maximum at 351 nm and which provides radiation intensity of about 1–2 mW/cm$^2$) to yield a coatable syrup of about 3,000 centipoise (cPs). Then 0.1 part of KB-1 and 0.08 part HDDA were added to the syrup with thorough mixing. The sample was coated at 127 micrometer thickness between two siliconized polyester liners and polymerized under a bank of the same fluorescent UV lamps. The total UV dose was about 300 mJ/cm$^2$, which yielded a pressure-sensitive adhesive. Test samples were prepared as explained in Test Methods. The substrate was a dual layered film comprising a 2.5 mil (0.64 mm) polyurethane layer and a 4 mil (1.0 mm) polycarbonate reinforcement layer, with the polyurethane layer facing the adhesive.

The results of the tests for Examples 1–4 and Comparative Examples C-1, C-2, C-3, C-4, and C-5 can be found in Table 1.

Example 2

A test sample was made and tested as in Example 1, except the adhesive used had a ratio of 80 parts IOA, 18 parts NNDMA, 2 parts AA, and 0.08 part HDDA was used.

Example 3

A test sample was made and tested as in Example 1, except the adhesive used had a ratio of 80 parts BA, 18 parts NNDMA, 2 parts AA, and 0.08 part HDDA.

Example 4

A test sample was made and tested as in Example 1, except the adhesive used had a ratio of 60 parts IOA, 25 parts IBA, 15 parts NNDMA, and 0.08 part HDDA.

Comparative Example C-1

A test sample was made as in Example 1, except the adhesive used had a ratio of 65 parts IOA, 33 parts IBA and 2 parts acrylic acid (AA), which is termed CA 1 in Table 1.

Comparative Example C-2

For this comparative example, a test sample was made as in Example 1, except the adhesive used was CA 2.

Comparative Example C-3

For this comparative example, a test sample was made as in Example 1, except the adhesive used was CA 3.

Comparative Example C-4

For this comparative example, a test sample was made and tested as in Example 1, except the adhesive used was CA 4.

Comparative Example C-5

For this comparative example, a test sample was made and tested as in Example 1, except the adhesive used was CA 5.

TABLE 1

| Ex. | Comp. | T-Peel (N/cm)[1] | T-Peel (lb$_f$/in)[1] | T$_g$ (°C.) |
|---|---|---|---|---|
| 1 | IOA/NNDMA/AA/HDDA | 12.1, 5.8, 4.9 | 6.9, 3.3, 2.8 | −3 |
| 2 | IOA/NNDMA/AA/HDDA | 9.3, 5.1, 6.1 | 5.3, 2.9, 3.5 | −14 |
|  | BA/NNDMA/AA/HDDA | 11.9. 5.6, 7.0 | 6.8, 3.2, 4.0 | −13 |
| 4 | IOA/IBA/NNDMA/HDDA | 7.4, 5.1, 6.5 | 4.2, 2.9, 3.7 | 0 |

TABLE 1-continued

| Ex. | Comp. | T-Peel (N/cm)[1] | T-Peel (lb$_f$/in)[1] | T$_g$ (°C.) |
|---|---|---|---|---|
| CA-1 | IOA/IBA/AA/HDDA | 7.2, 0.7, 6.5. | 4.1, 0.4, 3.7 | −8 |
| CA-2 | AEROSET 1845 | 10.5, 1.8, 8.6 | 6.0, 1.0, 4.9 | −35 |
| CA-3 | IOA/AA | 4.0, 0.5, 1.9 | 2.3, 0.3, 1.1 | — |
| CA-4 | 65% of an acrylic latex (80/16/4 EA/BA/AA) and 35% of a urethane latex | 3.0, 4.9, 0.7 | 1.7, 2.8, 0.4 | — |
| CA-5 | IOA/NVP/AA/DINP | 4.7, 3.5, 3.3 | 2.7, 2.0, 1.9 | −4 |

[1]Peel Force (initial, 7 day oven, 10 day water soak)

Peel values less than 2 lb$_f$/in (3.5 N/cm) were considered unacceptable and values greater than 3 lb$_f$/in (5.3 N/cm) were preferred. The CA-3 and CA-4 adhesives gave unacceptable performance in at least two of the three T-peel tests. The CA-5 adhesive gave values close to the unacceptable range in both the thermal conditioned and water soak T-peel test.

The CA-1 and CA-2 adhesives exhibited high initial and 10 day water soak T-peel values but performed poorly in the T-peel test after thermal conditioning. The adhesive probably absorbed the plasticizer during thermal conditioning, and as a result, its performance was lowered.

In addition, the adhesives of comparative Examples CA-1, CA-2, CA-3, CA-4, and CA-5 all failed the pressure wash test after thermal conditioning.

In contrast, the preferred inventive adhesive of Example 1 exhibited acceptable T-peel values in all the tests. The initial adhesion was high (~6.9 lb$_f$/in [12.1 N/cm]). The values dropped after both thermal conditioning and water sealing but the peel values in both these tests were a significant improvement over the Comparative Examples. Further, this adhesive passed the pressure wash test after both thermal conditioning and water soaking.

The 60/25/15 IOA/IBA/NNDMA formulation and the IOA(BA)/NNDMA/AA formulations passed both the T-peel and pressure wash tests.

Examples 5–9

Example 5

A premix was prepared using 80 parts IOA, 15 parts NNDMA, 5 parts AA, and 0.04 part KB-1. This mixture was partially polymerized under a nitrogen-rich atmosphere by exposure to ultraviolet radiation (40 watt black lamp) to provide a coatable syrup having a viscosity of about 3000 cps. 0.05 part HDDA and 0.16 part KB-1 were then added to the syrup and it was knife coated onto silicone-treated polyethylene-coated paper release liner at a thickness of 5 mils (0.127 mm). The resulting composite was then exposed to ultraviolet radiation having a spectral output from 300–400 nm with a maximum at 351 nm in a nitrogen-rich environment. An intensity of about 3 mW/cm$^2$ was used during an exposure time sufficient to result in a total energy of 550 mJ/cm$^2$.

The adhesives of Examples 5–9 were tested in accordance with the test methods above and the results shown in Table 2.

Example 6

A test sample was made and tested as in Example 5, except that 0.075 part ABP was added prior to the partial polymerization step, and 0.04 part of HDDA rather than 0.05 part was added to the syrup.

Example 7

A sample was made and tested as in Example 5, except that 0.108 part of ABP was substituted for the HDDA, an intensity of about 3 mW/cm$^2$ was used during an exposure time sufficient to result in a total energy of 450 mJ/cm in a first curing step, and a second high intensity, UV curing step was used which employed a medium pressure mercury vapor lamp for a time sufficient to produce a total energy in the second step of 250 mJ/cm$^2$.

Example 8

A sample was made and tested as in Example 7, except that 0.09 part of ANT was substituted for the ABP.

Example 9

A sample was made and tested as in Example 7, except that 0.3 part of CPIA was substituted for the ABP.

TABLE 2

| Ex. | Comp. | Amounts | T-Peel (N/cm)[1] | T-Peel (lb$_f$/in)[1] |
|---|---|---|---|---|
| 5 | IOA/NNDMA/AA/HDDA /KB-1 | 80/15/5/0.05/0.2 | 11.1, 6.3, 3.6 | 6.3, 3.6, 3.6 |
| 6 | IOA/NNDMA/AA/HDDA /ABP/KB-1 | 80/15/5/0.04/ 0.075/0.2 | 12.6, 7.4, 7.7 | 7.2, 4.2, 4.4 |
| 7 | IOA/NNDMA/AA/ABP/ KB-1 | 80/15/5/0.108/0.2 | 13.3, 7.0, 8.4 | 7.6, 4.0, 4.8 |
| 8 | IOA/NNDMA/AA/ANT/ KB-1 | 80/15/5/0.09/0.2 | 13.1, 7.2, 9.3 | 7.5, 4.1, 5.3 |
| 9 | IOA/NNDMA/AA/CPIA/ KB-1 | 80/15/5/0.3/0.2 | 11.9, 8.8, 8.1 | 6.8, 5.0, 4.6 |

[1]Peel Force (initial, 7 day oven, 10 day water soak)

All articles of the invention made using the adhesives of Examples 5–9 passed the static shear test and exhibited acceptable T-peel values in all the tests. The initial adhesion was high for all of these examples. The values dropped on both thermal conditioning and water soaking but the peel values in both these tests were a significant improvement over the Comparative Examples of Table 1. Further, the adhesives of Examples 5–9 passed individual pressure wash tests after thermal conditioning and water soaking.

Example 10

The test samples having compositions set forth in Table 3 were made in accordance with Example 6. The samples were evaluated using the test methods described above.

Sample B had the best balance of properties (low and room temperature tack, peel and shear). Sample E performed well with the exception of low temperature tack and Samples C and D lacked sufficient shear.

Bond making is difficult if the adhesive modulus exceeds $3 \times 10^5$ Pascals at the measurement temperature.

Example 11

Two sheets of a heat sealable 0.0635 mm thick ethylene acrylic acid film (EA90, also designated PL50 from Consolidated Thermoplastics Co.) were heat sealed on the lateral edges and bottom to form a rectangular pouch measuring 3.175 cm wide on a liquid form, fill, and seal machine. The pouch was then filled with a pressure-sensitive adhesive composition having 80 parts IOA, 15 parts NNDMA, 5 parts AA, 0.60 part KB-1, 0.10 part ABP, and 0.01 part IOTG. The filled pouch was then heat sealed at the top in the cross direction through the monomer to form individual pouches measuring 3.175 cm by 3.175 cm by about 0.356 cm thick containing 1.9 grams of the PSA.

The pouches were placed in a water bath that was maintained between about 21° C. and 32° C. and exposed to ultraviolet radiation at an intensity of about 2 mW/cm$^2$ for 8.33 minutes. The radiation was supplied from lamps having about 90% of the emissions between 300 and 400 nm and a maximum at 351 nm.

The pouches were then fed to a single screw extruder (Haake) with barrel temperatures set at about 177° C. and die temperatures set at about 177° C. The pressure-sensitive adhesive was extruded to a thickness of 0.0508 mm onto a paper web that was treated on both sides with a silicone release coating. The coated adhesive was then e-beam cured.

Results are listed in Table 4.

TABLE 3

| Sample | IOA/NNDMA/ | Tg (°C.) | Tack @ 2 dwell (gm | Tack @ 1 dwell (gm | 24 hr. T | 8 day ove (N/cm) | 10 day wa (N/cm) | 7 day oven s |
|---|---|---|---|---|---|---|---|---|
| A (4 runs) | 84/12/4 | −11 | 1118 | 902 | 8.3 | 6.8 | 5.6 | 325 |
| B (4 runs) | 82/12/6 | −3 | 618 | 180 | 9.5 | 7.4 | 5.6 | 4565* |
| C (8 runs) | 78/18/4 | −3 | 849 | 184 | 10.0 | 8.1 | 6.0 | 1350 |
| D (3 runs) | 80/15/5 | −3 | 820 | 154 | 10.2 | 8.2 | 5.8 | 1585 |
| E (4 runs) | 76/18/6 | 6 | 183 | 0 | 10.9 | 9.3 | 5.6 | 4660* |

*indicates that roughly half of the samples gave shear values greater than 10,000 minutes

TABLE 4

| E-beam dose | Tack @ 22° C., 1 sec dwell (gm) | Tack @ 10° C., 10 sec dwell (gm) | 24 hr 24 hr T-peel (N/cm) | 7 day oven T-peel (N/cm) | 14 day oven T-peel (N/cm) | 10 day water T-peel (N/cm) | 7 day oven shear (mins) |
|---|---|---|---|---|---|---|---|
| 2 MRAD | 323 | 142 | 8.8 | 8.4 | 7.4 | 4.4 | 10,000+ |
| 3 MRAD | 500 | 50 | 8.9 | 8.1 | 7.4 | 4.0 | 7400 |

Further modifications to the adhesives and articles of the invention will be apparent to those having skill in the art. Thus, the appended claims are not limited to their literal wording nor to the specifically described embodiments.

What is claimed is:

1. An article comprising:
   (a) a layer of pressure-sensitive adhesive consisting essentially of a crosslinked copolymer of 100 parts by weight monomer of components (i), (ii), (iii) and (iv) wherein the copolymer consists essentially of:
   (i) about 50 to about 90 parts by weight of at least one monomer selected from the group consisting of a first monofunctiontal acrylate or methacrylate ester of a non-tertiary alkyl alcohol, and mixtures thereof, the alkyl group of which comprises from about 4 to about 12 carbon atoms, which as a homopolymer has a glass transition temperature less than −25° C.;
   (ii) about 10 to about 15 parts by weight of copolymerizable N,N-diallyl substituted amides;
   (iii) about 3 to about 6 parts by weight of an acidic monomer copolymerizable with the monomer(s) of component (i) and the copolymerizable N,N-dialkyl substituted amides of component (ii), wherein when the acidic monomer is included, the copolymerizable N,N-dialkyl substituted amides are present in a molar excess;
   (iv) 0 to about 30 parts by weight of a second monofunctional acrylate or methacrylate ester of a non-tertiary alcohol having as a homopolymer a glass transition temperature equal to or greater than −25° C.;
   (v) about 0.01 to about 1 percent by weight of a crosslinking agent based upon the total weight of (i) plus (ii) plus (iii) plus (iv), wherein the relative amounts of components (i), (ii), (iii), and (iv) are selected such that the article passes all of the following tests selected from the group consisting of a pressure wash test after water soaking, a static shear test (initial), a T-peel test (initial), and a T-peel test after water soaking; wherein said tests are performed with the article applied to an acidic surface; and
   (vi) about 0.01 to about 0.5 percent by weight of an initiator based upon the total weight of (i) plus (ii) plus (iii) plus (iv); and
   (b) an adherend onto which the adhesive is coated.

2. The article in accordance with claim 1 wherein a monomericly plasticized PVC component having at least 10 percent by weight of monomeric plasticizer and having at least one surface is adhered with the pressure-sensitive adhesive to said adherend.

3. The article in accordance with claim 2 wherein said adherend is selected from the group consisting of i) a transparent retroreflective sheeting having a substantially flat surface and a structured second surface, the structured second surface comprised of a plurality of grooves defining a plurality of peaks, a polymeric sealing film attached to the structured second surface at a plurality of locations, the sealing film contacting said adhesive, ii) a metallized retroreflective sheeting having a substantially flat surface and structured second surface, the structured surface having a layer of metal thereon, the adhesive contacting the metal layer, iii) a beaded retroreflective sheeting having a nonlight-impinging surface, said adhesive contacting said non-light-impinging surface, and iv) non-retroreflective adherends selected from the group consisting of polymeric films and metallic films.

4. The article in accordance with claim 3 wherein said adherend is a retroreflective sheeting.

5. The article in accordance with claim 4 wherein said retroreflective sheeting is selected from the group consisting of embedded lens sheetings, encapsulated lens sheetings, and structured sheetings.

6. The article in accordance with claim 2 wherein said monomericly plasticized PVC component is a monomericly plasticized PVC coated fabric having at least 10 percent by weight of monomeric plasticizer.

7. The article in accordance with claim 2 wherein the PVC component comprises from 10 to about 50 weight percent monomeric plasticizer.

8. The article of claim 2 wherein a second surface of the PVC component is adhered to a surface of a plastic material via at least one method selected from the group consisting of hot air fusion, heat application, or radio frequency welding.

9. The article in accordance with claim 1 wherein said N,N-dialkyl substituted amide is selected from monomers within the general formula (I):

wherein:
R is selected from the group consisting of —H and —CH$_3$;
Z is —C(=O)NR$^1$R$^2$; and
R$^1$ and R$^2$ are independently selected from the group consisting of alkyl groups having from 1 to 10 carbon atoms.

10. The article of claim 1 wherein the first monofunctional acrylate ester monomer is selected from the group consisting of n-butyl acrylate, n-butyl methacrylate, isobutyl acrylate, 2-methyl butyl acrylate, 2-ethylhexyl acrylate, n-octyl acrylate, isooctyl acrylate, isooctyl methacrylate, isononyl acrylate, isodecyl acrylate, and mixtures thereof.

11. The article of claim 1 wherein said copolymerizable N,N-dialkyl substituted amide is selected from the group consisting of N,N-dimethyl acrylamide, N,N-dimethyl methacrylamide, N,N-diethyl acrylamide, N,N-diethyl methacrylamide and mixtures thereof.

12. The article of claim 1 wherein the acidic monomer is selected from the group consisting of ethylenically unsaturated carboxylic acids, ethylenically unsaturated sulfonic acids, ethylenically unsaturated phosphoric acids, and mixtures thereof.

13. The article of claim 12 wherein the acidic monomer is selected from the group consisting of acrylic acid, methacrylic acid, itaconic acid, fumaric acid, crotonic acid, citraconic acid, maleic acid, β-carboxyethyl acrylate, sulfoethyl methacrylate, and mixtures thereof.

14. The article of claim 1 wherein the acidic monomer is present at from about 5 to about 6 parts by weight.

15. The article of claim 1 wherein said second monofunctional acrylate ester is present at from about 1 to about 30 parts by weight.

16. The article of claim 1 wherein the crosslinking agent is selected from the group consisting of multifunctional acrylates, substituted triazines, monoethylenically unsaturated silanes, hydrogen abstraction compounds, copolymerizable α-cleavage photoinitiators, bisamide compounds, and heat activated copolymerizable crosslinking agents.

17. A method of bonding a monomericly plasticized PVC component having at least 10 percent by weight of monomeric plasticizer to an adherend, the method comprising the steps of:

(a) formulating a pressure-sensitive adhesive composition consisting essentially of a crosslinked copolymer of 100 parts by weight monomer of components (i), (ii), (iii) and (iv) wherein the copolymer consists essentially of:
  (i) about 50 to about 90 parts by weight of at least one monomer selected from the group consisting of a first monofunctional acrylate or methacrylate ester of a non-tertiary alkyl alcohol, and mixtures thereof, the alkyl group of which comprises from about 4 to about 12 carbon atoms, which as a homopolymer has a glass transition temperature less than $-25°$ C.;
  (ii) about 10 to about 15 parts by weight of copolymerizable N,N-dialkyl substituted amides;
  (iii) about 3 to about 6 parts by weight of an acidic monomer copolymerizable with the monomer(s) of component (i) and the copolymerizable N,N-dialkyl substituted amides of component (ii), wherein when the acidic monomer is included, the copolymerizable N,N-dialkyl substituted amides are present in a molar excess;
  (iv) 0 to about 30 parts by weight of a second monofunctional acrylate ester of a non-tertiary alcohol having as a homopolymer a glass transition temperature equal to or greater than $-25°$ C.;
  (v) about 0.01 to about 1 percent by weight of a crosslinking agent based upon the total weight of (i) plus (ii) plus (iii) plus (iv), and
  (vi) about 0.01 to about 0.5 percent by weight of an initiator based upon the total weight of (i) plus (ii) plus (iii) plus (iv);

(b) applying the adhesive composition either to a monomericly plasticized PVC component having at least 10 percent by weight of monomeric plasticizer, a surface of a substrate, or both; and (c) joining an adherend with the PVC component, the surface of a substrate, or both, the adhesive composition disposed between the PVC component, the surface of a substrate, or both, and said adherend.

18. The method in accordance with claim 17 wherein said adherend is selected from the group consisting of i) a transparent retroreflective sheeting having a substantially flat surface and a structured second surface, the structured second surface comprised of a plurality of grooves defining a plurality of peaks, a polymeric sealing film attached to the structured second surface at a plurality of locations, the sealing film contacting said adhesive, ii) a metallized retroreflective sheeting having a substantially flat surface and structured second surface, the structured surface having a layer of metal thereon, the adhesive contacting the metal layer, iii) a beaded retroreflective sheeting having a nonlight-impinging surface of, said adhesive contacting the non-light-impinging surface, and iv) non-retroreflective adherends selected from the group consisting of polymeric films and metallic films.

19. The method in accordance with claim 17 wherein the copolymerizable N,N-dialkyl substituted amides are selected from the group consisting of N,N-dimethyl acrylamide, N,N-dimethyl methacrylamide, N,N-diethyl acrylamide, N,N-diethyl methacrylamide and mixtures thereof.

20. The method in accordance with claim 17 wherein after step (b) and prior to step (c) the adhesive is exposed to conditions sufficient to crosslink the adhesive.

21. The method in accordance with claim 20 wherein said conditions comprise the step of exposing the adhesive to an electron beam.

22. A method of bonding a monomericly plasticized PVC component having at least 10 percent by weight of monomeric plasticizer to an adherend, the method comprising the steps of:

(a) filling a pouch with a precursor comprising 100 parts by weight monomer of components (i), (ii), (iii) and (iv) wherein the precursor comprises:
  (i) about 50 to about 90 parts by weight of at least one monomer selected from the group consisting of a first monofunctional acrylate or methacrylate ester of a non-tertiary alkyl alcohol, and mixtures thereof, the alkyl group of which comprises from about 4 to about 12 carbon atoms, which as a homopolymer has a glass transition temperature less than $-25°$ C.;
  (ii) about 10 to about 25 parts by weight of copolymerizable N,N-dialkyl substituted amides;
  (iii) 0 to about 7 parts by weight of an acidic monomer copolymerizable with the monomer(s) of component (i) and the copolymerizable N,N-dialkyl substituted amides of component (ii), wherein when the acidic monomer is included, the copolymerizable N,N-dialkyl substituted amides are present in a molar excess;
  (iv) 0 to about 30 parts by weight of a second monofunctional acrylate ester of a non-tertiary alcohol having as a homopolymer a glass transition temperature equal to or greater than $-25°$ C.; and
  (v) about 0.01 to about 1 percent by weight of a crosslinking agent based upon the total weight of (i) plus (ii) plus (iii) plus (iv), (b) exposing said pouch filled with said precursor to low intensity ultraviolet radiation having a radiation intensity of about 1 to about 2 mW/cm$^2$ yielding an adhesive;

(c) extruding said pouch containing said adhesive onto a liner yielding an extruded pouch adhesive;

(d) exposing said extruded pouch adhesive to radiation yielding a crosslinked adhesive;

(e) applying the crosslinked adhesive either to a monomericly plasticized PVC component having at least 10 percent by weight monomeric plasticizer, a surface of a adherend, or both; and (f) joining the adherend with the PVC component, the crosslinked adhesive composition disposed between the PVC component and said surface of the adherend.

* * * * *